Nov. 13, 1934.  R. B. SIMNING  1,980,298
VEHICLE TRANSPORT
Original Filed Oct. 2, 1929  3 Sheets-Sheet 1
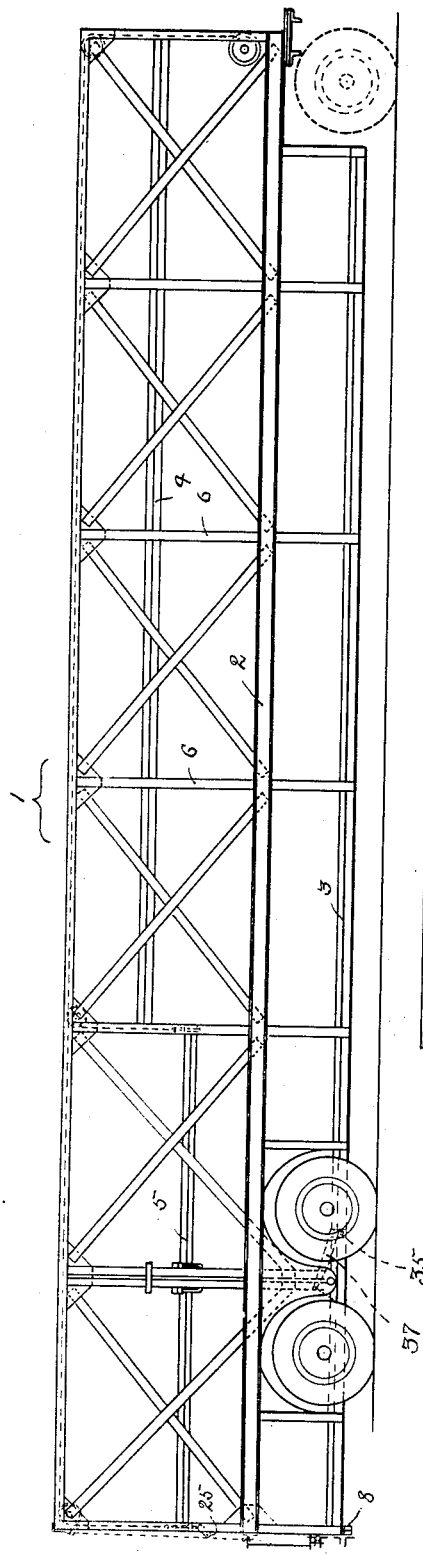
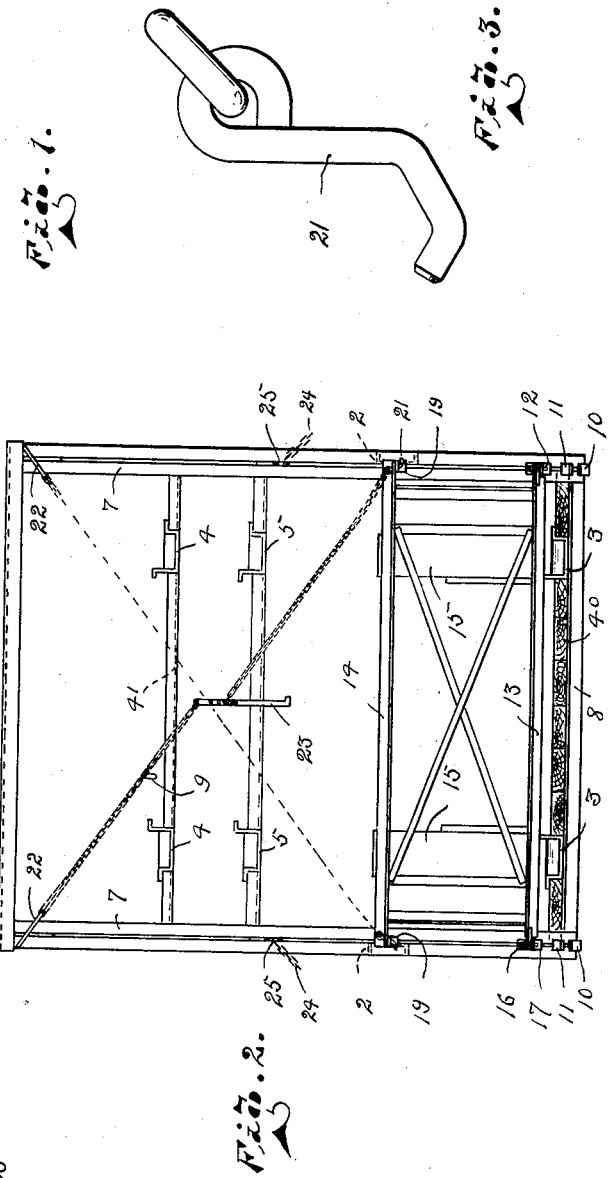
Inventor
Roy B. Simning
Attorney

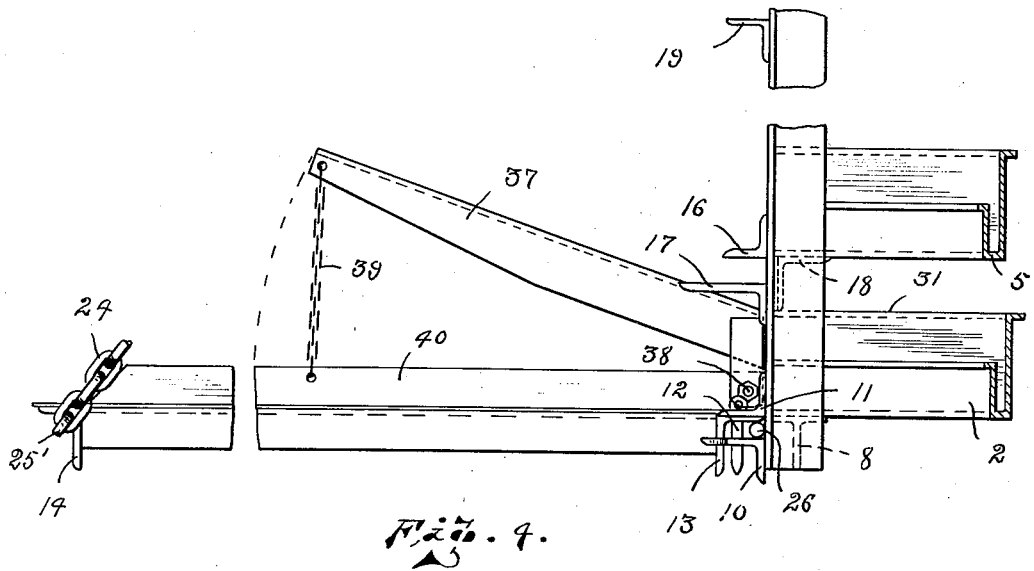
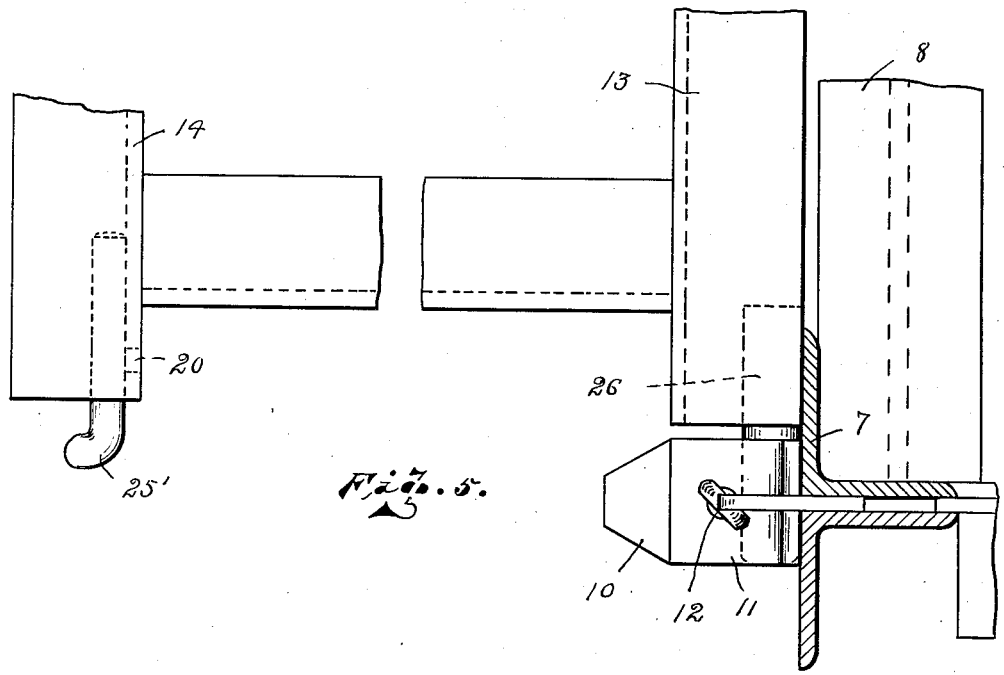

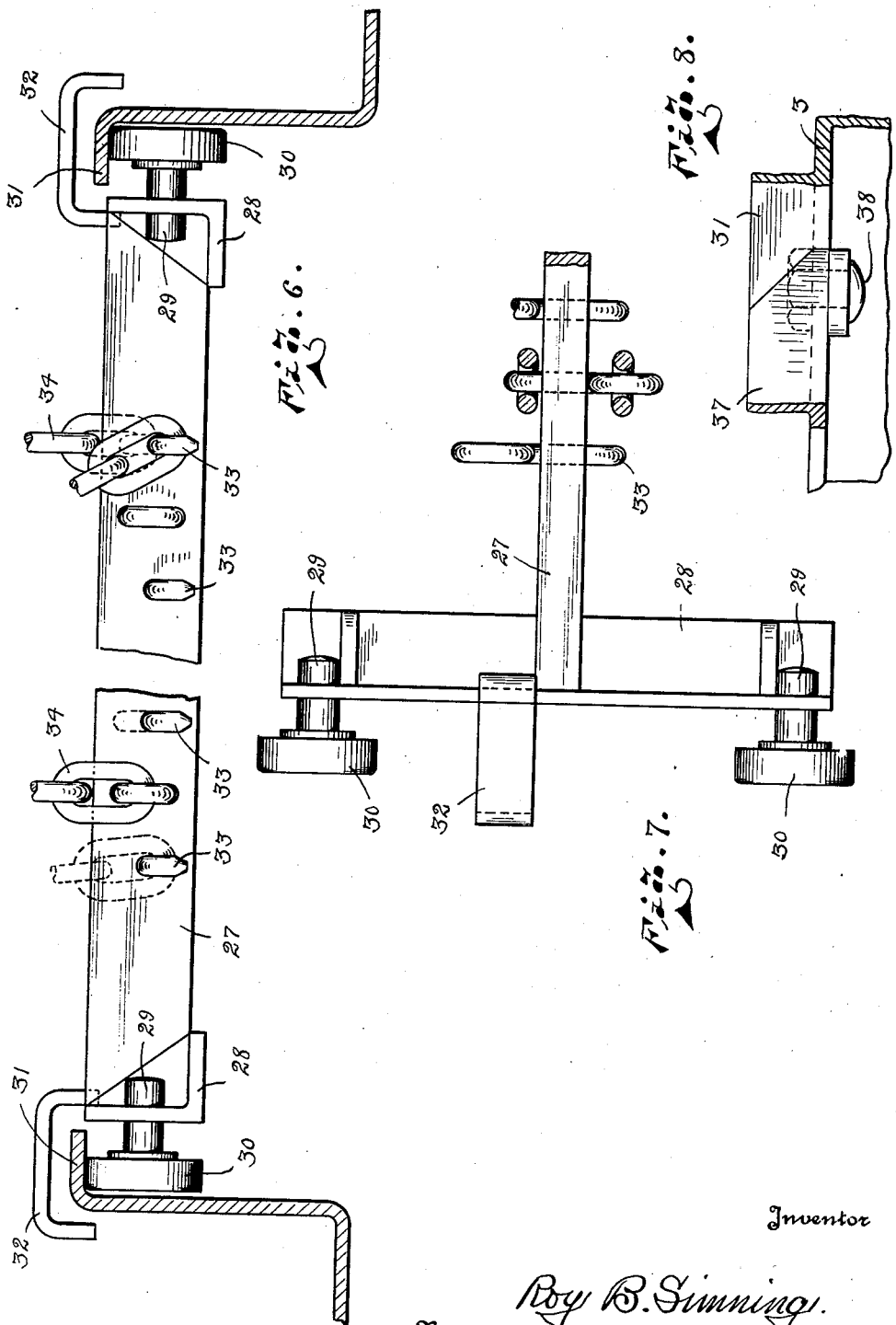

Patented Nov. 13, 1934

1,980,298

UNITED STATES PATENT OFFICE 1,980,298

VEHICLE TRANSPORT

Roy B. Simning, Minneapolis, Minn.

Refiled for abandoned application Serial No. 396,910, October 2, 1929. This application February 12, 1934, Serial No. 710,950

10 Claims. (Cl. 280—179)

This invention relates to vehicles, primarily designed for the transportaton of automobiles over highways, and the principal object is to provide a more practical, simple, and efficient device of this character than heretofore known.

Another object is to produce a novel form of means for initially depressing the automobiles for economy in space during transportation.

Further objects and advantages of the invention will appear in the following description thereof.

This application is a substitute for application Serial No. 396,910, filed October 2, 1929.

Referring now to the accompanying drawings, forming part of this application, and wherein like reference characters indicate like parts:

Figure 1 is a side elevation of my improved vehicle:

Figure 2 is an enlarged rear end elevation of Figure 1;

Figure 3 is a further enlarged elevation of the lower terminal hook of one of the end bracing chains;

Figure 4 is an enlarged fragmental side elevation of the adjustable tail gate connection to the vehicle body, and pull down mechanism;

Figure 5 is an enlarged fragmental plan of one corner of the tail gate connection with the vehicle;

Figure 6 is a side elevation of the opposed ends of one of the tie down rods;

Figure 7 is a plan view of one end of one of the tie down rods; and

Figure 8 is a fragmental plan view of the pivotal connection of one of the pull down mechanisms.

1 represents a fabricated vehicle body for the purpose described, similar in some respects to that shown in my copending application Ser. No. 331,572, and which is provided with two major supporting girders or channels 2, one upon either side of the structure and above the supporting wheels thereof; the illustration here used being that of a semi-trailer, that is to say, a vehicle the front end of which is supported upon a towing vehicle.

This illustration, furthermore, is likened unto my former application in that it is of a double deck vehicle, the lower deck tracks being Illustrated at 3 and the upper deck tracks at 4. In the rear of the vehicle is installed an elevator 5 of any desired structure and operated as preferred to serve the upper deck in loading and unloading automobiles. This elevator is provided with track members similar in shape to the channel like tracks in the main body portion of the vehicle, so that an automobile may be carried thereupon during transportation in a like manner to the cars carried in the main body portion. The side upright stanchions 6 of the vehicle are each composed of angle bars, varying somewhat at different places in the vehicle in their assembled relation to each other. At 7 is indicated one of the rearmost upright angles which extends from the bottom to the top of the body portion of the vehicle, there being a like angle at each corner placed with its back to the outermost angle as clearly shown in Figure 2 of the drawings, and slightly spaced apart to provide for the corner gusset plates. Intermediate of the lowermost end of these outer angles and transverse the bottom of the vehicle and forming the girder therefor, is the T-iron 8, upon which, intermediate of the corners, rides the channel tracks 3 for the carried vehicles. Upon the rear face of each pair of corner angles just described and at the lowermost extremities thereof is attached an angle clip 10 one flange of which extends horizontally and rearwardly to act as a support for the tail gate. Spaced above the clip 10 is a similarly shaped angle clip 11, there being suitably aligned holes in the horizontal portion of the clips for the insertion of the pin 12 when the tail gate is in place so that by the pin the gate is locked to horizontal car receiving position as illustrated in Figure 4 of the drawings.

The tail gate is of fabricated frame-like structure comprising the angle bar 13 upon its inner lowermost edge, and a similar transverse angle 14 upon its free edge, and provided with spaced channel-like runways 15 leading to the channel tracks in the lower deck of the body of the vehicle, that is when the gate is assembled as shown in Figure 4. Spaced above the angles 10 and 11 are two similarly shaped angle clips 16 and 17, with like aligned holes therein for the pin 12 when the gate is adjusted to this uppermost position, and which position brings the runways 15 upon the tail gate in registrable alignment with the channel tracks on the floor of the elevator 5 when in its lowermost position as the elevator is provided with transverse angle beams 18 at either end thereof which rest upon the upper angle of the tracks 9 when lowered, thus the tail gate is made to function as a horizontal ramp for either the lower tracks or the elevator tracks, and when the gate is mounted in this uppermost position it may be folded upwardly after loading and operated in conjunction with the angle clips 19, similar to those previously described and fixed to the stanchion 7 as by a bracing or reinforcing member to the rear end of the body of the vehicle; this cooperative union occurring by the forming of a hole indicated at 20 in the projecting end of the angle 14 on the free end of the gate which overlaps the clip 19 when the gate is brought against the end of the body, and preferably engaged by the crooked terminal pin 21 attached to the free end of the diagonal bracing chains, the opposite ends of which are fixed within the clip 22 upon the opposite upper corners of the end of the body, and each of these chains are equipped intermediate their ends with a lever as indicated at 23 so that after being hooked into the gate and clip 19 as described, they may be drawn taut by the lever being folded back against for example the uppermost half of the bracing chain and there retained by the use of a suitable link 9 attached to said chain.

As an additional supporting means for the tail gate I have provided the chain 24 leading from the laterally projecting lugs 25' on the corners of the gate to anchoring clips 25 fixed intermediate of each pair of angles 7, and as a pivotal support for the gate when in either lower or upper position on the body I have provided pins illustrated at 26 fixed to the innermost corners of the gate and projecting laterally therefrom so as to occur intermediate of either the pair of angles 10 and 11 or the pair of angles 16 and 17, and between the pin 12 and the face of the angles 7, as clearly illustrated.

The tie down or compression means resulting in the automobiles being carried occupying the least vertical space possible, comprises the transverse bar 27, supported at its ends upon angle bars 28 carrying gudgeons 29, one adjacent each end thereof and which carry rollers or wheels 30 designed to be engaged beneath the innermost projecting flange 31 of the channel tracks when the tie down bar is attached to the springs of the car being carried. Intermediate of each pair of wheels or rollers 30 and overlapping the flange or angle 31 of the track, and fixed to the upper edge of each channel bar 28, is a channel clip 32 to act as a support and guide for the tie down bar 27 when no upward stress is applied thereto. As a convenient attachment for the tie down bar to the springs of the automobile I provide preferably a plurality of spaced hooks 33 upon either side of the bar, and a short piece of chain 34, one end of which may be engaged with the suitably positioned hook for the occasion on one side of the bar, brought up over the spring of the car and down to the other side of the bar and attached to the suitably positioned hook thereupon, while the bar is being held up or supported in any desired manner previous to its being brought into engagement with the fixed positions of the respective tracks.

Now it is obvious that levers or other forms of pull down means may be provided to depress the cars for attachment of the chains 34, but I prefer to accomplish the depression of the cars by means of which is termed the pull down mechanism; one set of which is illustrated in dotted lines at 35 in Figure 1 of the drawings, and another pivotally attached to the inner edge of the tail gate, there necessarily being two such sets, the former for the cars carried in the lower forward deck of the transport, and the latter for cars carried in the upper deck and elevator of the transport and last car on the lower deck.

Each pull down device comprises a pivotally mounted angular ramp 37 for each carrying track and which is pivotally mounted as at 38 upon a suitable pin or bolt attaching same (in the case of the rearmost ramps) to the upright flange of the angle 40 adjacent the inner side of each track section of the gate, and which connection is close to the inner pivotal end of the gate. Whereas in the case of the ramps 37 for the cars on the forward lower deck, they are pivotally attached in a like manner to the upright web of each track, the horizontal portion of each ramp registering with the horizontal flange 31 of the track which it serves when the ramp is in its elevated position.

The process employed in utilizing the ramps in automatically pulling down the cars loaded thereover is as follows:

The rams naturally lie prone upon the members to which they are attached during the passage of an automobile thereover, it being understood that only the rear end of the cars necessitate being depressed, and as soon as the rear springs occur over the ramps, the latter are raised by hand on their pivotal connections, and one of the pull down bars 27, previously described, are brought into place with their rollers 30 bearing upwardly against the under side of the flanges of the ramps when the chains 34 at either end of the bar are wrapped about the leaves of the springs suspending the bar as closely as possible therebeneath. Then when the car is advanced forwardly upon the tracks, the rollers 30 of the pull down bars having to traverse the inclined ramps will automatically apply downward stress upon the springs until the rollers have become engaged beneath the horizontal fixed flanges of the track 31 and there hold the car in their thus depressed position until again released during the unloading process of the cars, when the pull down ramps 37 are again free to assume their folded position.

There is illustrated at the free end of each ramp a chain 39 of suitable predetermined length for limiting the upward movement of the ramps when stress forwardly is applied to the car being pulled down, and it is apparent that the rearmost ramps attached to the end gate may so permanently remain whether the gate is folded up or in its horizontal position, and the pull down ramps in the location indicated at 35 also remain in fixed position upon the tracks.

It will be noted that the abutting joint of the flange on the track cooperatively engaged with the ramp 37 is previously cut at an angle as shown in Figure 8, that is diagonally as viewed in respect to a plan view so that the passage of the rollers 30 thereunder is graduating rather than abrupt as would be the case in the event of the joint being at right angles.

At 40 in Figure 2 is shown the preferred arrangement of plank flooring intermediate of the lower tracks 3—3 and also intermediate of said tracks and the sides of the vehicle, to form a convenient deck for the transportation of freight other than automobiles when so desired, and as a protection to such freight thus carried as well as to the cars when carried upon the lower deck I prefer to use a lighter flooring or cover on substantially the same level as the upper tracks 4—4 as illustrated in dotted lines at 41 and which decking may be of corrugated iron or canvas as preferred, and the sides and ends of the vehicle body may be also protected with some similar light material.

Having thus described my invention, what I claim and desire to secure by Letters Patent, is:

1. A vehicle transport of the type described having tracks thereupon for the carried vehicles, and ramps for loading said vehicles, of means cooperative with said ramps and tracks for depressing said vehicles when being loaded and retaining same depressed during transportation.

2. A vehicle transport of the type described having ramps thereupon for loading the carried vehicles, characterized by having means cooperatively associated with said ramps for depressing said vehicles while being loaded.

3. A vehicle of the type described comprising in combination a frame-like fabricated body portion supported upon wheels, lower and upper track-like runways for carrying vehicles within said body portion, a ramp at the after end of the body portion for loading the vehicles, means attachable to the vehicles and cooperatively connected with the ramp and lower runways for depressing the carried vehicles for transportation.

4. A vehicle of the type described comprising in combination a highway vehicle carrying vehicle, supporting and guiding tracks for the carried vehicles during transportation, and means attachable to the vehicle and cooperatively associated with the tracks for holding the carried vehicles depressed as they traverse under their own power the tracks.

5. The combination with a highway vehicle transport, of tracks thereupon for the carried vehicles, a hold-down bar attachable to said vehicles and having rollers at the ends thereof underlapping the transport tracks for holding depressed the vehicles transported as they traverse said tracks.

6. A vehicle transport of the type described having tracks thereupon for the carried vehicles, of ramps registrable with said tracks, and pull down means attachable to said vehicles and cooperative with said ramps for depressing said vehicles while traversing said ramps and retaining same depressed on said tracks during transportation.

7. A vehicle transport of the type described having tracks thereupon for the carried vehicles, characterized by having ramps cooperatively associated with said tracks, and pull down means cooperative with said ramps and tracks for depressing said vehicles while being loaded and retaining same depressed upon said tracks.

8. A vehicle transport of the type described having tracks provided with inwardly projecting flanges for the carried vehicles, ramps having inwardly projecting flanges registrable with said tracks, pull-down means attachable to the vehicles and underlaping said flanges and movable longitudinally thereof for depressing said vehicles while being loaded and retaining same depressed upon said tracks.

9. In combination, a vehicle carrying vehicle structure, a pair of channel-like tracks upon said structure for supporting and guiding the wheels of the carried vehicles, and portable tie down means extending from one track to the other cooperatively connecting said carried vehicles with said tracks.

10. A pair of channel tracks for vehicle carrying vehicles, each comprising a flat bottom portion, a major side portion and a minor side portion, and an inwardly extending flange upon said major side portions, and a tie down bar having rollers at the ends thereof for underlapping engagement with the flanges of said major sides.

ROY B. SIMNING.